(12) United States Patent
Schmidt et al.

(10) Patent No.: US 10,819,431 B2
(45) Date of Patent: Oct. 27, 2020

(54) OPTICAL COMMUNICATION SYSTEM AND METHOD

(71) Applicant: FRAUNHOFER-GESELLSCHAFT ZUR FÖRDERUNG DER ANGEWANDTEN FORSCHUNG E.V., Munich (DE)

(72) Inventors: Christian Schmidt, Berlin (DE); Volker Jungnickel, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/308,361

(22) PCT Filed: Jun. 8, 2016

(86) PCT No.: PCT/EP2016/063069
§ 371 (c)(1),
(2) Date: Dec. 7, 2018

(87) PCT Pub. No.: WO2017/211413
PCT Pub. Date: Dec. 14, 2017

(65) Prior Publication Data
US 2019/0132048 A1 May 2, 2019

(51) Int. Cl.
*H04B 10/12* (2006.01)
*H04B 10/2507* (2013.01)
(Continued)

(52) U.S. Cl.
CPC .......... *H04B 10/2507* (2013.01); *H04B 3/32* (2013.01); *H04B 10/25073* (2013.01);
(Continued)

(58) Field of Classification Search
CPC ........ H04J 14/02; H04J 14/0204; H04J 14/04; H04B 10/2507; H04B 3/32;
(Continued)

(56) References Cited

U.S. PATENT DOCUMENTS 5,502,799 A * 3/1996 Tsuji .................. G01J 3/28
345/600
5,680,490 A * 10/1997 Cohen .................. H04J 14/02
385/24
(Continued)

FOREIGN PATENT DOCUMENTS

| EP | 0 762 690 A2 | 3/1997 |
| EP | 0 984 580 A2 | 3/2000 |
| WO | 03/077449 A1 | 9/2003 |

OTHER PUBLICATIONS

S. Randel et al. "Mode-Multiplexed 6×20-GBd QPSK Transmission over 1200-km DGD-Compensated Few-Mode Fiber" Optic Fiber Communication Conference, Los Angeles, Unites States, 2012.
Buelow, H., "Optical-Mode Demultiplexing by Optical MIMO Filtering of Spatial Samples," IEEE Photonics Technology Letters, vol. 24, Issue 12, pp. 1045-1047 (Jun. 15, 2012).
(Continued)

*Primary Examiner* — Hibret A Woldekidan
(74) *Attorney, Agent, or Firm* — Maschoff Brennan

(57) ABSTRACT

It are provided an optical communication system and an optical communication method. The system comprising at least two optical channels for communicating optical data signals; at least one optical filter arrangement for compensating distortions of the optical data signals communicated via the optical channels and/or crosstalk between the optical channels. The optical filter arrangement comprises at least one optical filter assigned to one of the optical channels and at least one optical filter assigned to the other one of the optical channels, wherein each one of the optical filters is configurable in such a way that different wavelength components of an incoming optical signal will be modified individually.

16 Claims, 3 Drawing Sheets

(51) Int. Cl.
*H04J 14/04* (2006.01)
*H04B 10/67* (2013.01)
*H04B 3/32* (2006.01)

(52) U.S. Cl.
CPC ............ *H04B 10/671* (2013.01); *H04J 14/04* (2013.01); *H04B 2210/252* (2013.01)

(58) Field of Classification Search
CPC ............ H04B 10/25073; H04B 10/671; H04B 2210/252; H04B 10/0795; H04Q 2011/0016; H04Q 2011/0009; G02F 2201/30; G02F 2201/305; G02F 2203/055; G02B 2006/12109; G02B 2006/12164
USPC ...... 398/79, 82, 84, 85, 87, 44, 45, 48, 149, 398/147, 159, 25
See application file for complete search history.

(56) References Cited

U.S. PATENT DOCUMENTS

| | | | | |
|---|---|---|---|---|
| 5,832,091 | A * | 11/1998 | Tomko | G06K 9/00006 380/30 |
| 9,014,557 | B2 * | 4/2015 | Graves | H04Q 11/0005 398/45 |
| 9,599,508 | B2 * | 3/2017 | Kester | G01J 3/2823 |
| 9,838,114 | B2 * | 12/2017 | Froc | H04B 10/2507 |
| 10,320,478 | B2 * | 6/2019 | Hauske | H04B 10/61 |
| 10,355,705 | B2 * | 7/2019 | Schmidt | H04B 7/0413 |
| 10,444,070 | B2 * | 10/2019 | Kester | G01J 3/0229 |
| 10,523,329 | B2 * | 12/2019 | Esman | H04B 10/697 |
| 2002/0126291 | A1 * | 9/2002 | Qian | H04J 14/02 359/577 |
| 2002/0197000 | A1 * | 12/2002 | Marom | H04J 14/0205 385/17 |
| 2012/0008950 | A1 | 1/2012 | Jander et al. | |
| 2014/0064723 | A1 * | 3/2014 | Adles | H04B 10/616 398/25 |

OTHER PUBLICATIONS

Doerr, R., C., "Proposed Architecture for MIMO Optical Demultiplexing Using Photonic Integration," IEEE Photonics Technology Letters, vol. 23, Issue 21, pp. 1573-1575 (Nov. 1, 2011).

Doerr, R., C., et al., "Simple Multichannel Optical Equalizer Mitigating Intersymbol Interference for 40-Gb/s Nonreturn-To-Zero Signals," Journal of Lightwave Technology, vol. 22, issue 1, pp. 249-256 (Jan. 2004).

Feng, F., et al., "All-optical Mode-Group Division Multiplexing Over a Graded-Index Ring-Core Fiber with Single Radial Mode," Optical Fiber Communications Conference and Exhibition (OFC) 2016, IEEE, pp. 3 (2016).

Finisar, "Programmable narrow-band filtering using the WaveShaper 1000E and WaveShaper 4000E," White Paper, pp. 1-6 (2008).

Finisar, "WaveShaper Family of Programmable Optical Processors," Product Guide, pp. 1-12 (2015).

Fontaine, K., N., et al., "Space-division multiplexing and all-optical MIMO demultiplexing using a photonic integrated circuit," OFC/NFOEC Postdeadline Papers © 2012 OSA, pp. 3 (2012).

Jungnickel, V., et al., "A Radio System with Multi-element Antennas," IEEE VTS 53rd Vehicular Technology Conference, pp. 167-170 (2001).

Jungnickel, V., et al., "Performance of a MIMO System with Overlay Pilots," IEEE Global Telecommunications Conference, pp. 5 (2001).

Maruyama, S., et al., "Optical-Electrical Hybrid Signal Equalizer for Ultra-High-Speed Transmission," Proceedings of SPIE, vol. 9388, pp. 93880N-1-93880N-6 (2015).

Morichetti, F., et al., "4-Channel All-Optical MIMO Demultiplexing on a Silicon Chip," OFC 2016 © OSA 2016, pp. 3 (2016).

Randel, S., "First Real-Time Coherent MIMO-DSP for Six Coupled Mode Transmission," IEEE Photonics Conference, ICP 2015, pp. 2.

Sakamoto, T., "Mode-Division Multiplexing Transmission System With DMD-Independent Low Complexity MIMO Processing," Journal of Lightwave Technology, vol. 31, Issue 13, pp. 2192-2199 (Jul. 1, 2013).

* cited by examiner

OPTICAL COMMUNICATION SYSTEM AND METHOD

CROSS-REFERENCE TO A RELATED APPLICATION

This application is a National Phase Patent Application of International Patent Application Number PCT/EP2016/063069, filed on Jun. 8, 2016.

BACKGROUND

It is provided an optical communication system and an optical communication method.

Conventionally, distortions of optical data signals and/or crosstalk between optical data channels are compensated by means of digital electronic signal processing. For example, digital signal processing methods are used for compensating crosstalk between optical channels provided by using different spatial modes of optical fibers (i.e. in mode division multiplexing systems). For example, the publication S. Randel et al., "Mode-Multiplexed 6×20-GBd QPSK Transmission over 1200-km DGD-Compensated Few-Mode Fiber", Optical Fiber Communication Conference, Los Angeles, Calif., United States, 2012 discloses such an electronic compensation method.

However, the electronic compensation requires complex algorithms and thus considerable processing power, which limits the real-time compensation at high data rates. Further, in wavelength division multiplexing systems the electronic compensation has to be carried out for all wavelengths involved, which requires an even more complex and thus expensive electronic compensation system.

SUMMARY

An object is to provide a communication system and method simplifying the distortion and/or crosstalk compensation, in particular at high data rates.

According to an embodiment an optical communication system is provided, comprising
- at least two optical channels for communicating optical data signals;
- at least one optical filter arrangement for compensating distortions of the optical data signals communicated via the optical channels and/or crosstalk between the optical channels,
- wherein the optical filter arrangement comprises at least one optical filter assigned to one of the optical channels and at least one optical filter assigned to the other one of the optical channels,
- wherein each one of the optical filters is configurable in such a way that different wavelength components of an incoming optical signal will be modified individually.

Thus, according to the embodiment, the signal processing (i.e. the distortion and/or crosstalk compensation) is carried out in the optical domain rather than in the electronic domain. This allows, for example, a compensation during high data rates transmissions without high electronic processing power. Moreover, the optical compensation can be carried out simultaneously for a plurality of wavelengths, i.e. the compensation scheme can be easily implemented in multiplexing schemes involving wavelength division multiplexing at high data rates.

According to a further embodiment, the at least two optical channels are provided a) by spatially separated optical paths (implementing a space division multiplexing scheme), b) by using at least two optical carrier waves having different polarizations (implementing a polarization division multiplexing scheme) and/or c) by using at least two optical carrier waves having different orbital angular momentum states—OAM states (implementing a OAM division multiplexing scheme).

The spatially separated optical paths, in turn, may be realized using at least two optical free space waves, at least two spatially separated optical waveguides, at least two cores of a multicore fiber and/or at least two modes of an optical fiber (e.g. of a few mode fiber). Of course, the above mentioned multiplexing schemes could be combined with each other and/or with other multiplexing schemes such as wavelength division or time division multiplexing. Further, it is noted that the at least two data channels might be used for communicating the same optical data signal (e.g. for coherent combining schemes, for example, using free space optics).

Moreover, the optical filter arrangement may be configurable in such a way that the phase and/or the amplitude of the different wavelength components of the incoming optical signal will be modified individually. For example, the optical filters are programmable optical filters, whose transmission characteristics, including amplitude and/or phase, can be configured. The programmable optical filters might be provided by a device that is configured to carry out a spatial Fourier transform of the incoming light. It is noted that the "incoming light" may be a data signal communicated via one of the optical channels or a portion of the data signal.

For example, the programmable optical filters are part of a wave shaper device (such as e.g. the Finisar WaveShaper 4000S or 16000S). Such a wave shaper device comprises a grating wherein light coupled into the device is reflected at the grating and dispersed angularly, wherein the wavelength components of the light are directed to different portions of a switching element (e.g. a liquid crystalline silicon element). By using (e.g. video processing) algorithms the switching element modifies the amplitude and/or the phase of the wavelength components. The modified wavelength components are directed from the switching element to an output port of the wave shaper device. The wavelength (or frequency) resolution of the optical filter arrangement is thus defined by the spectral resolution of the wave shaping device (e.g. its grating). For example, the resolution is approximately 1 GHz.

Moreover, the optical communication system might comprise a multiplexer (e.g. a spatial multiplexer) for multiplexing at least two input signals, wherein the optical filter arrangement is used for pre-compensation, wherein output signals of the optical filter arrangement are used as input signals supplied to the multiplexer. That is, the optical filter arrangement may be part of a transmitter unit of the optical communication system.

The optical communication system may also comprise a demultiplexer, wherein the optical filter arrangement is used for compensating the demultiplexed signals (e.g. impairments of MIMO channels on the signals), wherein output signals of the demultiplexer are supplied to the optical filter arrangement. For example, the optical filter arrangement is part of a receiver unit of the optical communication system. Of course, the optical communication system may comprise two optical filter arrangements, wherein a first optical filter arrangement is part of a transmitter unit of the communication system and a second optical filter arrangement is part of a receiver unit of the communication system.

The optical filter arrangement may further be configured for receiving L input signals and for generating M output signals, wherein the optical filter arrangement comprises L×M optical filters.

Further, the optical filter arrangement may comprise L optical splitters wherein each optical splitter splits an incoming signal into M optical partial signals, each optical partial signal being supplied to one of the optical filters.

It is also possible that the optical filter arrangement comprises M optical combiners, wherein each optical combiner combines the output of a plurality (e.g. L) optical filters.

It is noted that it is of course also conceivable that the optical communication system comprises hardware for carrying out a digital electronic compensation in addition to the optical compensation provided by the optical filter arrangement.

It is also provided a communication method, in particular using the optical communication system as described above, the method comprising the steps of:
communicating optical data signals via at least two optical channels;
compensating distortions of the data signals communicated via the optical channels and/or crosstalk between the optical channels using at least one optical filter arrangement,
wherein the optical filter arrangement comprises at least one optical filter assigned to one of the optical channels and at least one optical filter assigned to the other one of the optical channels, and wherein each one of the optical filters is configurable in such a way that different wavelength components of an incoming optical signal will be modified individually.

The optical characteristics of the optical filters (e.g. their transmission and/or phase shift behavior) may be set using the results of a calibration measurement with respect to the at least two optical channels. The calibration measurement might be carried out using a channel estimation scheme with respect to the at least two optical channels.

For example, the channel estimation scheme comprises transmitting a channel estimation sequence via the two optical channels. According to an embodiment of this variant, a first channel estimation sequence is transmitted via one of the optical channels and a second channel estimation sequence is transmitted via the other one of the optical channels, wherein the first channel estimation sequence is distinguishable from the second channel estimation sequence. For example, orthogonal sequences might be transmitted over the first and the second optical channel for channel estimation or the sequences could be transmitted in orthogonal time intervals over the first and the second optical channel.

Another example for the calibration measurement is to use a modulation frequency swept laser source at one transmitter and a detector measuring amplitude and/or phase of the signal at one receiver and/or at all receivers simultaneously. The calibration measurement is performed for all pairs of transmitters and receivers.

It is also possible that the optical characteristics of the optical filters are set adaptively (during operation of the communication system) using an output signal of at least one of the optical filters. In addition or as an alternative, a calibration measurement, e.g. as described above, could be carried out during operation of the communication system.

Additionally or alternatively to the calibration measurement with respect to the at least two optical channels, there can be a calibration measurement and a calibration routine for the optical filters themselves.

BRIEF DESCRIPTION OF THE DRAWINGS

Embodiments are explained in more detail with reference to the drawings.

DETAILED DESCRIPTION

Figure 1:
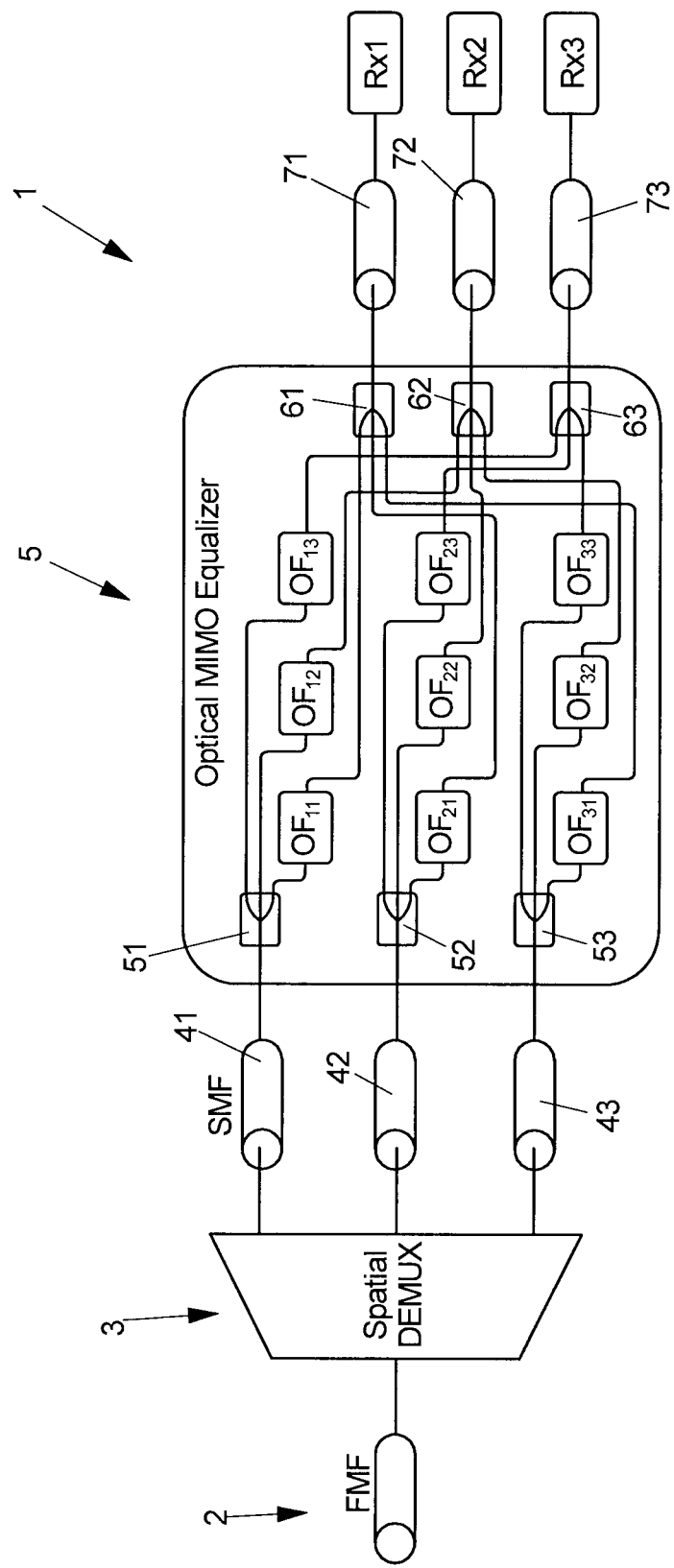
FIG. 1 shows a diagram illustrating a receiver portion of an optical communication system.

FIG. 1 depicts a receiver portion 1 of an optical communication system according to an embodiment. The optical communication system comprises a few mode fiber 2, wherein optical data signals are communicated via different modes of the few mode fiber 2. The few mode fiber 2 thus provides a plurality of spatially separated optical paths which form part of different optical communications channels provided by the optical communication system. Of course, instead of or in addition to the few mode fiber 2 other means could be used for providing the optical data channels such as at least one multicore fiber having at least two spatially separated cores. Also free space transmission could be employed instead of few mode fiber 2 or polarization division multiplexing is used, wherein polarization beam splitters might be provided for generating carrier waves of different polarization. Possible means for providing the optical communication channels of the optical communication system have been already discussed above. Further, wavelength division multiplexed signals might be communicated via the spatially separated optical paths, thereby combining space division and wavelength division multiplexing.

The optical data signals communicated via the few mode fiber 2 are demultiplexed using a spatial demultiplexer 3, wherein the demultiplexed signals are output to three single mode fibers 41 to 43. Of course, more than three optical channels and thus more than three different optical data signals could be communicated such that more than the three single mode fibers 41 to 43 would be employed.

Note, that not necessarily single mode fibers need to be used as interconnection between the optical equalizer and the multiplexer and the receiver, respectively. Rather, free space, waveguide or multimode coupling arrangements might be suited as well as mentioned above.

The output signals of the demultiplexer 3 are supplied to an optical filter arrangement in the form of an optical MIMO equalizer 5 via the single mode fibers 41 to 43. The optical MIMO equalizer 5 comprises three optical splitters 51 to 53, wherein each one of the optical splitters 51 to 53 receives the output of one of the single mode fibers 41 to 43 and splits the received light into partial signals, Each one of the partial signals, in turn, is supplied to one of a plurality of optical filters $OF_{ij}$ of the optical MIMO equalizer 5. The output signals of the optical filters $OF_{ij}$ are fed into combiners 61 to 63, wherein output ports of the combiners 61 to 63 are connected to further single mode fibers 71 to 73. The single mode fibers 71 to 73 supply the output signals of the combiners 61 to 63 to receivers Rx1 to Rx3. In case wavelength division multiplexed signals are communicated via the few mode fiber 2, the receivers Rx1 to Rx3 might be wavelength division multiplex receivers.

The optical filters $OF_{ij}$ are programmable filters and as such part of a wave shaper device as already set forth above. More particularly, the transmission characteristic, i.e. amplitude and/or phase, of each one of the optical filters $OF_{ij}$ can be adjusted independently, wherein wavelength components of the light supplied to the optical filters $OF_{ij}$ can be modified individually. In particular, the characteristics of the optical filters $OF_{ij}$ are set dependent on MIMO matrix coefficients $H_{ij}$ underlying the communication system. The MIMO matrix describes the transmission characteristics of the communication system, i.e. a functional relationship between multiple input (sent) signals and multiple output (received) signals. The MIMO matrix coefficients $H_{ij}$ may be estimated using a channel estimation scheme as described above.

Thus, by adjusting the filter characteristics of each one of the optical filters $OF_{ij}$ individually it is possible to compensate distortions and/or crosstalk between the optical channels. For example, cross talk components of the MIMO matrix (i.e. MIMO matrix coefficients $H_{ij}$, $i \neq j$) are compensated by adjusting the optical filters $OF_{ij}$, $i \neq j$ accordingly. For example, the characteristics of the optical filters $OF_{ij}$ may be set dependent on coefficients of the inverse of the MIMO matrix.

It is noted that the optical communication system according to FIG. 1 comprises three input signals (generated by three transmitters not shown in FIG. 1) and three output signals (the signals received by the receivers Rx1 to Rx3), wherein three optical communications channels are provided (disregarding the cross talk channels, which are not considered as communication channels). Accordingly, the optical communication system could be described as a 3×3 MIMO system. However, the embodiment is of course not restricted to a particular number of input or output signals. Rather, the embodiment could be implemented in any MIMO system having any number of input and output signals (i.e. a N×M MIMO system), see e.g. FIG. 2.

Figure 2:
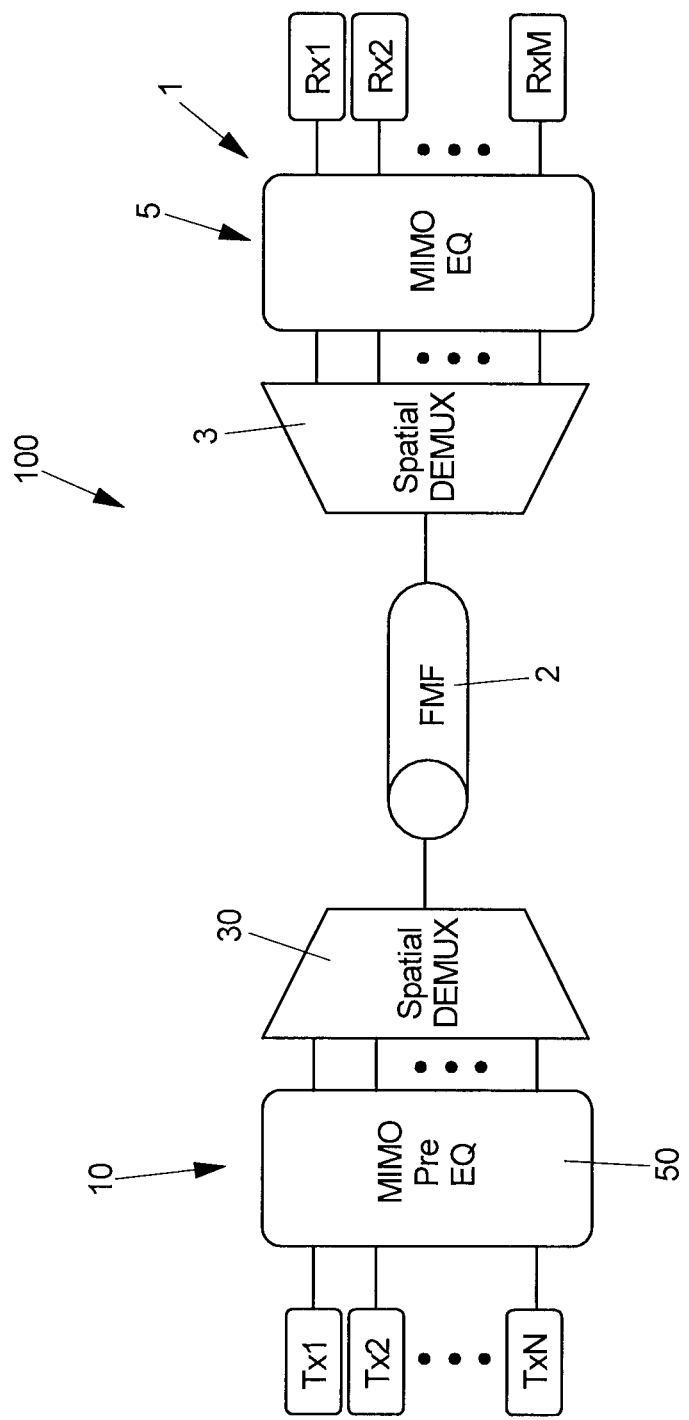
FIG. 2 shows a diagram of an optical communication system.

FIG. 2 shows an embodiment of an optical Communication system 10. The system 10 comprises a receiver portion 1, which might be configured identically to the receiver portion illustrated in FIG. 1 (i.e. comprising a MIMO equalizer 5). However, the receiver portion 1 may comprise any number of receivers Rxj, j=1, . . . , M.

The optical system 10 further comprises a transmitter portion 10 that has a plurality of transmitters Txi, I=1, . . . , N. The data signals generated by the transmitters Txi are multiplexed into a few mode fiber 2 by means of a spatial multiplexer 30. The transmitters Txi might further be configured for transmitting wavelength division multiplexed signals, which are communicated via the spatially separated optical paths provided by the few mode fiber 2. Note, that other optical transmission media could be used as described forth above.

Between the transmitters Txi and the multiplexer 30 a further optical filter arrangement in form of a MIMO pre-equalizer 50 is arranged. The MIMO pre-equalizer 50 is configured similarly (or even identically) to the MIMO equalizer 5 of the receiving portion 1, i.e. the pre-equalizer 50 comprises a plurality of programmable optical filters used for individually filtering the optical data signals. The programmable optical filters of the pre-equalizer 50 may also be provided by a wave shaper unit.

The programmable optical filters of the pre-equalizer 50 are used for individually filtering the optical signals generated by the transmitters Txi, wherein the characteristics of the programmable optical filters are set dependent on the MIMO matrix coefficients $H_{ij}$ related to the optical communication system 100 as described above with respect to MIMO equalizer 5 depicted in FIG. 1. For example, MIMO processing based on a singular value decomposition of the MIMO matrix coefficients $H_{ij}$ could be utilized to determine the required characteristics of the programmable optical filters. Thus, the distortions and/or the cross talk between the optical data signals communicated by means of the optical communication system 100 are not only compensated in the receiver portion 1, but are also be compensated in the transmitter portion 10.

It is, of course, also conceivable that the optical communication system 100 comprises a single MIMO equalizer only (i.e. the MIMO pre-equalizer 50 of the transmitter portion 10 or the MIMO equalizer 5 of the receiver portion 1). For example, MIMO pre-equalizer 50 may obviate the need for MIMO equalizer 5 at the receiver portion 1 if the coherence time of the optical channels is greater than the feedback time to transmit channel state information from the receivers Rxj to the transmitters Txi.

Figure 3:
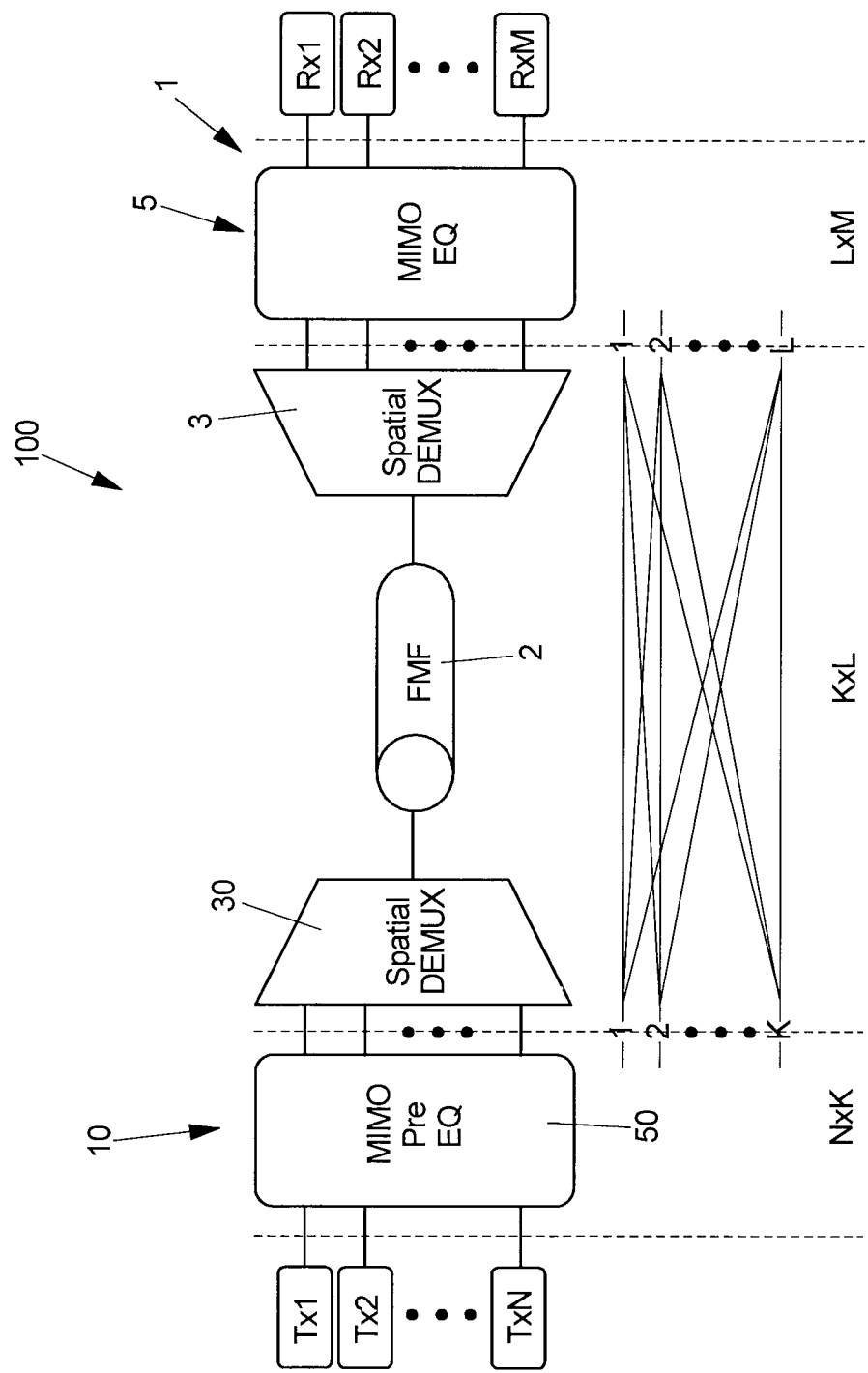
FIG. 3 shows a diagram further illustrating the optical communication system depicted in FIG. 2.

As illustrated in FIG. 3, the MIMO pre-equalizer 50 might be configured for mapping the N signals generated by the transmitters Txi onto K signals supplied to the spatial multiplexer 30. The spatial demultiplexer 3 may be configured to generate L signals such that the optical communication link between the spatial multiplexer 30 and the demultiplexer 3 may be regarded as a K×L MIMO system.

Moreover, the MIMO equalizer 5 of the receiver portion 1 maps the incoming L signals onto M signals fed to the receivers Rxj. Accordingly, the MIMO equalizer 5 may comprise L×M optical filters, while the MIMO pre-equalizer 50 may comprise N×K optical filters.

The invention claimed is:

1. An optical communication system comprising
at least two optical channels for communicating optical data signals;
at least one optical filter arrangement for compensating distortions of the optical data signals communicated via the optical channels and/or crosstalk between the optical channels,
wherein the optical filter arrangement comprises at least one optical filter assigned to one of the optical channels and at least one optical filter assigned to the other one of the optical channels,
wherein each one of the optical filters is configurable in such a way that different wavelength components of an incoming optical signal will be modified individually, and
wherein optical characteristics of the optical filters are set using the results of a calibration measurement that uses a channel estimation scheme with respect to the at least two optical channels.

2. The optical communication system as claimed in claim 1, wherein the at least two optical channels are provided a) by spatially separated optical paths, b) by using at least two optical carrier waves having different polarizations and/or c) by using at least two optical carrier waves having different orbital angular momentum states.

3. The optical communication system as claimed in claim 2, wherein the spatially separated optical paths are realized using at least two optical free space waves, at least two spatially separated optical waveguides, at least two cores of a multicore fiber and/or at least two modes of an optical fiber.

4. The optical communication system as claimed in claim 1, wherein the optical filters are configurable in such a way that the phase and/or the amplitude of the different wavelength components of the incoming optical signal will be modified individually.

5. The optical communication system as claimed in claim 1, wherein the optical filters are programmable optical filters.

6. The optical communication system as claimed in claim 1, further comprising a multiplexer for multiplexing at least two input signals, wherein the optical filter arrangement is used for pre-compensation, wherein output signals of the optical filter arrangement are used as input signals supplied to the multiplexer.

7. The optical communication system as claimed in claim 1, further comprising a demultiplexer, wherein the optical filter arrangement is used for compensating the demultiplexed signals, wherein output signals of the demultiplexer are supplied to the optical filter arrangement.

8. The optical communication system as claimed in claim 1, wherein the optical filter arrangement is configured for receiving L input signals and for generating M output signals, wherein the optical filter arrangement comprises L×M optical filters.

9. The optical communication system as claimed in claim 8, wherein the optical filter arrangement comprises L optical splitters, and wherein each optical splitter splits an incoming optical signal into M optical partial signals, each optical partial signal being supplied to one of the optical filters.

10. The optical communication system as claimed in claim 8, wherein the optical filter arrangement comprises M optical combiners, wherein each optical combiner combines the output of a plurality of the optical filters.

11. An optical communication method comprising the steps of:
communicating optical data signals via at least two optical channels;
compensating distortions of the data signals communicated via the optical channels and/or crosstalk between the optical channels using at least one optical filter arrangement,
wherein the optical filter arrangement comprises at least one optical filter assigned to one of the optical channels and at least one optical filter assigned to the other one of the optical channels, and wherein each one of the optical filters is configurable in such a way that different wavelength components of an incoming optical signal will be modified individually, and
wherein optical characteristics of the at least one optical filter is set using the results of a calibration measurement that uses a channel estimation scheme with respect to the at least two optical channels.

12. The optical communication method as claimed in claim 11, wherein the optical characteristics of the optical filters are set using the results of a calibration measurement with respect to the at least two optical channels.

13. The optical communication method as claimed in claim 11, wherein the channel estimation scheme comprises transmitting a channel estimation sequence via the two optical channels.

14. The method as claimed in claim 13, wherein a first channel estimation sequence is transmitted via one of the optical channels and a second channel estimation sequence is transmitted via the other one of the optical channels, wherein the first channel estimation sequence is distinguishable from the second channel estimation sequence.

15. The optical communication method as claimed in claim 11, wherein the optical characteristics of the optical filters are set adaptively using an output signal of at least one of the optical filters and/or by carrying out a calibration measurement.

16. An optical communication system comprising at least two optical channels for communicating optical data signals; at least one optical filter arrangement for compensating distortions of the optical data signals communicated via the optical channels and/or crosstalk between the optical channels, wherein the optical filter arrangement comprises at least one programmable optical filter assigned to one of the optical channels and at least one programmable optical filter assigned to the other one of the optical channels, wherein each one of the programmable optical filters is configurable in such a way that different wavelength components of an incoming optical signal will be modified individually and each one of the programmable optical filters is provided by a device that is configured to carry out a spatial Fourier transform of the incoming light.

* * * * *